United States Patent [19]

Hozumi

[11] Patent Number: 5,640,625
[45] Date of Patent: Jun. 17, 1997

[54] AUTOMATIC EXPOSURE CONTROL DEVICE FOR USE WITH A CAMERA HAVING A CONTINUOUS SHOOTING MODE

[75] Inventor: Toshiaki Hozumi, Tokyo, Japan

[73] Assignee: Nikon Corporation, Tokyo, Japan

[21] Appl. No.: 496,440

[22] Filed: Jun. 29, 1995

[30] Foreign Application Priority Data

Sep. 7, 1994 [JP] Japan .................................. 6-213713

[51] Int. Cl.⁶ ......................................................... G03B 17/00
[52] U.S. Cl. ................................................ 396/265; 396/447
[58] Field of Search .................................... 354/400, 402, 354/173.1, 173.11, 403; 396/265, 447

[56] References Cited

U.S. PATENT DOCUMENTS

| | | |
|---|---|---|
| 4,435,058 | 3/1984 | Yoshida et al. .......................... 354/403 |
| 5,187,515 | 2/1993 | Ishibashi et al. ........................ 354/400 |
| 5,311,229 | 5/1994 | Haraguchi ................................ 354/152 |
| 5,319,412 | 6/1994 | Hamada et al. .......................... 354/400 |
| 5,408,290 | 4/1995 | Haraguchi ................................ 354/402 |
| 5,479,235 | 12/1995 | Haraguchi ................................ 354/402 |
| 5,499,070 | 3/1996 | Miura ....................................... 354/152 |

*Primary Examiner*—Russell E. Adams
*Assistant Examiner*—Eric Nelson

[57] ABSTRACT

An automatic exposure control device for use with a camera having a continuous shooting mode includes, but is not limited to, a photometric unit measuring subject brightness, an exposure control unit controlling the automatic exposure control device according to the operation of the photometric unit, a range finding unit detecting subject distance, a focus control unit focusing a lens of the camera according to the operation of the range finding unit, a mirror raising unit raising a mirror of the camera and a timer timing the time from a start of a shutter release operation of the camera until the completion of a mirror raising operation by the mirror raising unit. The automatic exposure control device controls the range finding and photometry times for photographing a photographic frame during the time from an initial shutter release operation to a next shutter release operation during continuous shooting by adding an amount of time to the total time after the shutter release operation that must elapse before photometry and range finding operations can be carried out. The added amount of time equals the difference between a minimum mirror raising time at which range finding and photometry are possible and a measured mirror raising time.

12 Claims, 3 Drawing Sheets

AUTOMATIC EXPOSURE CONTROL DEVICE FOR USE WITH A CAMERA HAVING A CONTINUOUS SHOOTING MODE

BACKGROUND OF THE INVENTION

1. Field of the Invention

The present invention relates to an automatic exposure control device for use with a camera that incorporates a motor drive device to provide consistent continuous shooting operations.

2. Description of the Related Art

Cameras incorporating a motor drive device for providing continuous film advancement (i.e., continuous shooting) are known.

In a continuous shooting mode in the conventional motor driven camera, after the exposure of a first frame was completed and a main mirror was lowered, photometry and range finding were performed following the settling or stabilization of mirror vibration. Thereafter, a film was wound, a shutter charge sequence was completed and a next shutter release operation was commenced to expose another photograph.

However, with the conventional motor driven camera, because there was no signal indicating that the vibration of the mirror lowering operation had settled or stabilized, the time from a particular shutter release operation to the start time of range finding and photometry was an estimated time, and subsequent operational control was performed at that estimated time. For this reason, camera control was typically performed at the longest possible time at which range finding and photometry were possible in a particular photographic operation sequence.

With respect to the aforementioned time at which range finding and photometry were possible, for example, there is a known method in which the mirror raising time is detected, and camera control is performed according to a time resulting from a fixed time being added to the mirror raising time. The calculated amount of time serves as the amount of time at which range finding and photometry are possible after mirror lowering.

An example of another method for camera sequence control a proposal based on the principle that data from when a particular photometric operation was possible is used when photometry is not possible. Such a method is described in Japanese Laid-Open Patent Publication Number Hei 2-114245.

With the aforementioned conventional motor driven cameras and control methods, control was merely performed at the longest time at which range finding and photometry were possible. Moreover, when control was performed at a time value at which range finding and photometry were possible using the longest mirror lowering time even though the mirror raising time had been measured, the frame feed speed could not be accelerated.

Additionally, because motor drive time normally differs according to the degree of consumption of a power source (e.g., a battery), driving a motor in a single-lens reflex camera and control of the same is performed using the longest time at which range finding and photometry are possible. Accordingly, it is desirable that some type of countermeasure be devised to shorten the time during which range finding and photometry are carried out in order (1) to accelerate continuous shooting operations, and (2) to conserve precious battery life.

SUMMARY OF THE INVENTION

Accordingly, it is an object of the present invention to solve the aforementioned problems, and to provide an automatic exposure control device adapted for use with a camera that allows fast continuous shooting operations and which conserves camera battery life.

It is still another object of the present invention to provide an automatic exposure control device adapted for use with a camera having a continuous shooting mode of operation and which allows for fast shutter operations by carefully monitoring mirror raising and lowering times.

It is yet another object of the present invention to provide an automatic exposure control device adapted for use with a camera having a continuous shooting mode of operation and which allows fast shutter operations regardless of battery consumption of a battery of the camera.

It is still another object of the present invention to provide an automatic exposure control device adapted for use with a camera having a continuous shooting mode of operation and which measures the amount of time from one shutter releaser operation to another and which adjusts shutter operations accordingly.

It is a further object of the present invention to provide an automatic exposure control device adapted for use with a camera having a continuous shooting mode of operation and which awaits a measured and calculated amount of time prior to commencing photographic operations for a particular photographic session, the measured and calculated amount time being equal to an initial amount of time plus an amount of time corresponding to the minimum mirror raising time at which range finding and photometry are possible and a measured mirror raising time.

Objects of the present invention are achieved in an automatic exposure control device for use with a camera having a continuous shooting mode that includes, but is not limited to, a photometric unit measuring subject brightness, an exposure control unit controlling the automatic exposure control device according to the operation of the photometric unit, a range finding unit detecting subject distance, a focus control unit focusing a lens according to the operation of the range finding unit, a mirror raising unit raising a mirror of the camera and a timer timing the time from a start of a shutter release operation of the camera until the completion of a mirror raising operation by the mirror raising unit. The automatic exposure control device controls the range finding and photometry times for photographing a photographic frame during the time from an initial shutter release operation to a next shutter release operation during continuous shooting by adding an amount of time to the time total time that must elapse before a successive photographic operation can carried out. The added amount of time equals the difference between a minimum mirror raising time at which range finding and photometry are possible and a measured mirror raising time.

BRIEF DESCRIPTION OF THE DRAWINGS

Objects and advantages of the present invention will become apparent and readily appreciated from the following description of the preferred embodiments, taken in conjunction with the accompanying drawing figures, of which.

DETAILED DESCRIPTION OF THE PREFERRED EMBODIMENT

Figure 1:
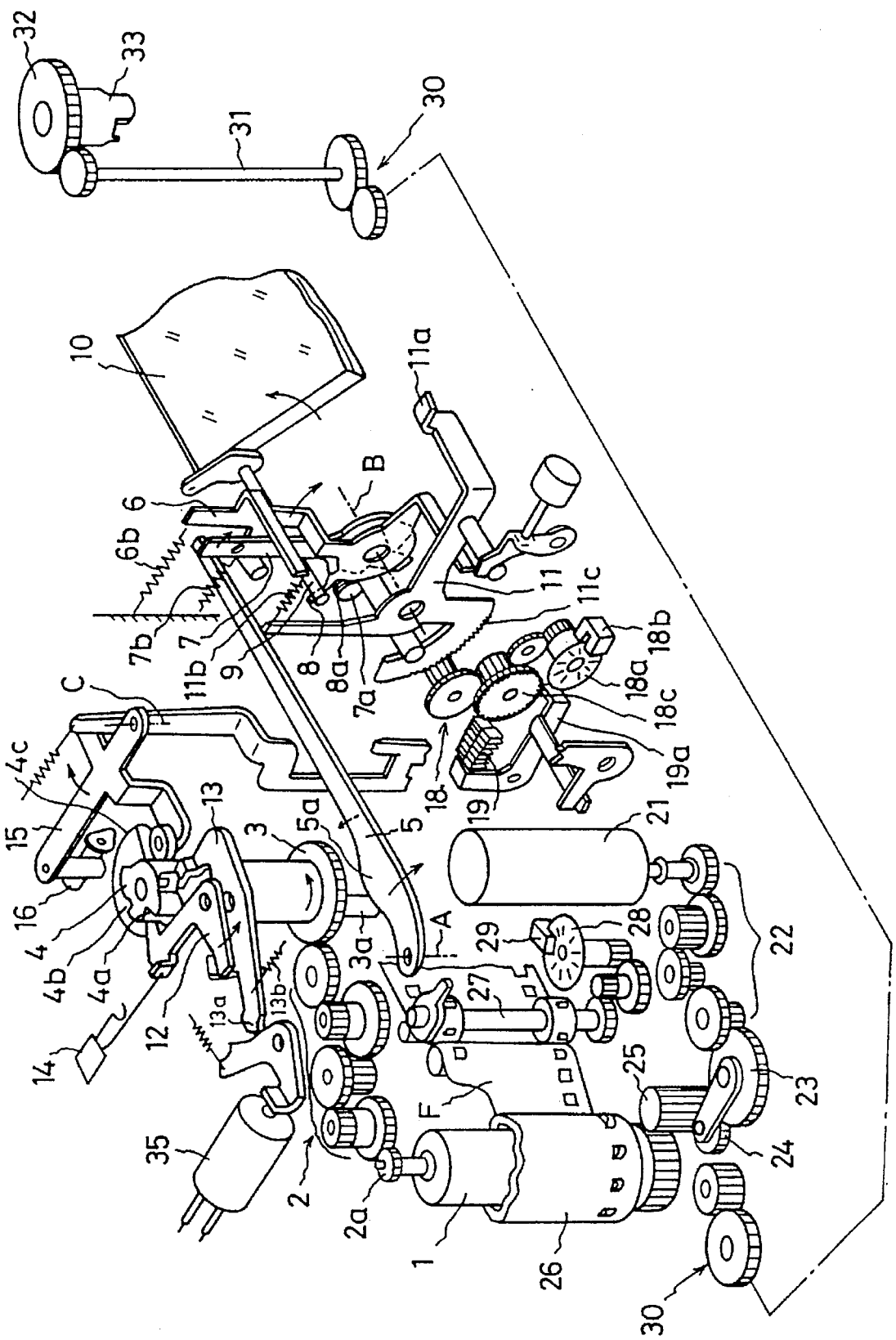
FIG. 1 is perspective view of an automatic exposure control device adapted for use with a camera according to a preferred embodiment of the present invention.

The following description is provided with reference to the drawing figures which were briefly described above. Like parts are referred to with like reference numerals.

Figure 2:
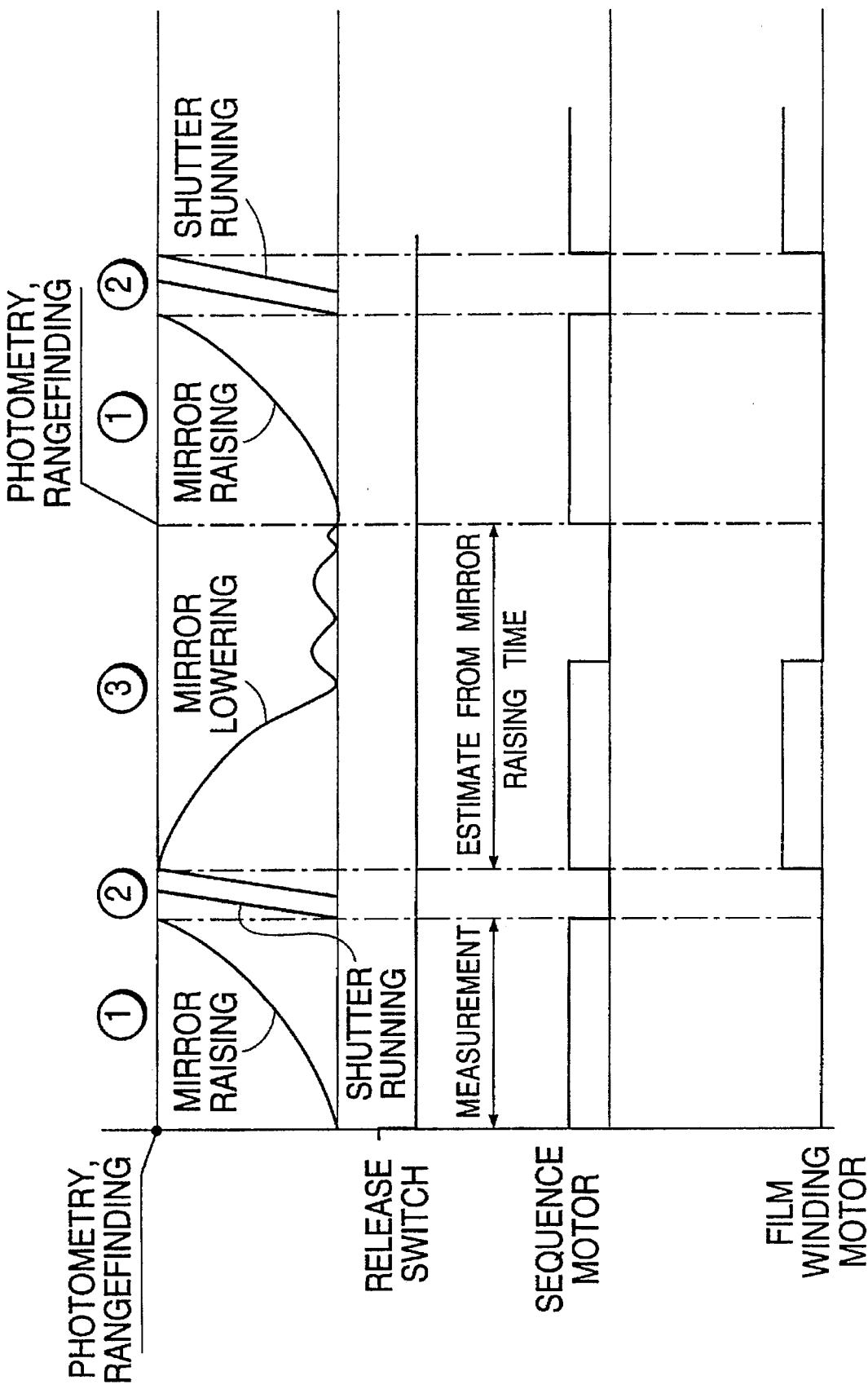
FIG. 2 is a sequence diagram that illustrates the operations of the embodiment illustrated in FIG. 1 during picture taking operations.
Figure 3:
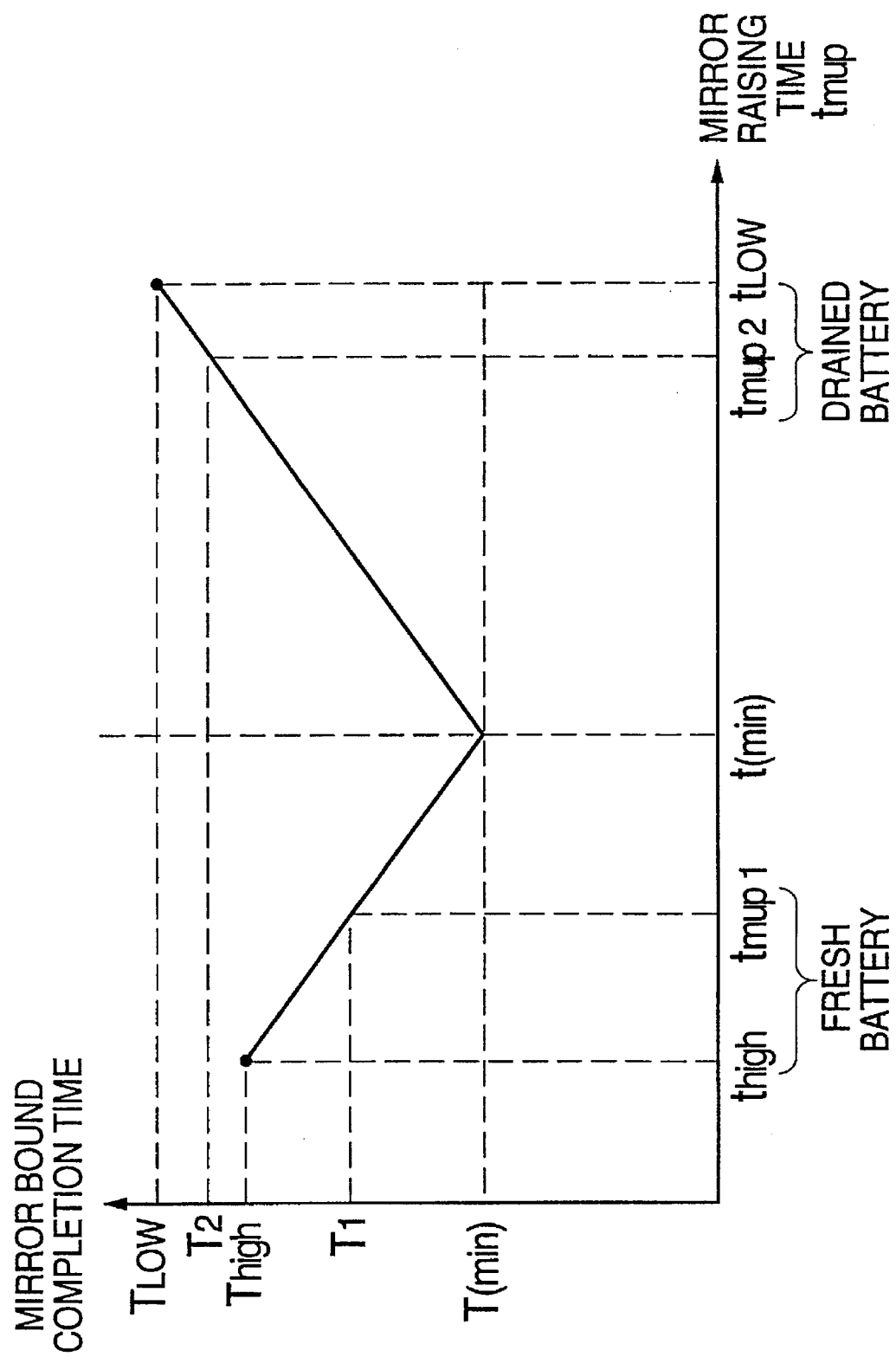
FIG. 3 is a sequence diagram that illustrates the process of obtaining an estimated mirror bound completion time in the automatic exposure control device illustrated in FIG. 1.

FIGS. 1 through 3 show a preferred embodiment of the present invention which has been incorporated into a motor driven camera that has a continuous shooting capability.

Referring now to FIG. 1, a sequence motor 1 operates the camera's internal mechanisms including the mechanisms concerned with mirror raising, mirror lowering, aperture shut-down, and shutter charging.

Mirror raising operations are first described as follows:

Sequence motor 1 rotates when the shutter release operation is performed. A gear 1a is attached to the top end of the motor shaft of sequence motor 1, and a driving force is transmitted to the cam 4 and the gear 3 on the same shaft via the idle gear train 2.

A pin 3a is attached to gear 3, and pin 3a comes into contact with a mirror drive lever 5. Through the rotation of sequence motor 1, gear 3 rotates in a counterclockwise direction as shown in the diagram. Pin 3a on gear 3 rotates mirror drive lever 5 in the clockwise direction in the diagram around center A.

Mirror drive lever 5 is resisted by a spring 6a, and it rotates a vertical lever 6 in the clockwise direction. Also, a mirror raising lever 8 is attached to vertical lever 7, which is supported on the same shaft as vertical lever 6 via an attachment pin 7a. Energy is imparted to mirror raising lever 8 in the clockwise direction by spring 8a, but is secured on the vertical lever 7 by a stopper which is not shown in the diagram. A spring 7b imparts energy to vertical lever 7 in the counterclockwise direction as shown in the diagram.

The present embodiment operates so that when vertical lever 7 rotates in the clockwise direction around center B in the aforementioned way, the mirror raising lever 8 also rotates in the same direction. Additionally, a mirror 10 is rotated in the counterclockwise direction in the diagram, that is, in the mirror raising direction, via a raising pin 9 which is attached to mirror 10 to thereby cause mirror 10 to be raised.

When mirror raising is completed, the front end of a cam stopping lever 12 is dropped into a groove 4b of cam 4, and the sequence switch 14 simultaneously is turned ON. When switch 14 is ON, sequence motor 1 stops rotating.

Aperture control of a lens which is not shown in the diagram is performed at the same time as the aforementioned mirror raising operation, and through the rotation of the mirror drive lever 5 in the clockwise direction, vertical lever 6, which is the center lever, is also resisted by spring 6a and rotates in the clockwise direction.

The aperture control lever 11 is connected to center lever 6 by spring 11b. Positioned on aperture control lever 11 are a fitting end 11a which fits together with the aperture control lever of the lens (not shown in the diagram), and a gear section 11c which meshes with gear train 18 for increasing speed. Additionally, there are a disc 18a which has slits for detecting aperture shut-down and a photointerrupter 18b for detecting those slits.

Also, a ratchet 18c for stopping the aperture control lever 11 is located on the same shaft as the gear shaft of gear train 18. The present embodiment is such that, by supplying a current to a magnet 19, a ratchet stopping lever 19a is moved away and ratchet 18c is stopped.

On the other hand, after mirror raising and aperture control have been completed, the shutter (not shown in the diagram) is operated, and an exposure is performed. After the completion of the exposure, a current is supplied to the solenoid 35 to stop a front end 13a of stopping lever 13. Accordingly, through spring 13b, cam stopping lever 12 is rotated in the counterclockwise direction and is moved away from cam groove 4a. Simultaneously, switch 14 is turned OFF.

When switch 14 is turned OFF, sequence motor 1 is again rotated, and cam 4 is rotated in the same direction as mirror 10. Simultaneously, gear 3 also rotates, and because pin 3a, which comes into contact with mirror drive lever 5, goes over protruding section 5a of mirror drive lever 5, mirror drive lever 5 is rotated in the counterclockwise direction as shown in FIG. 1. For this reason, vertical lever 7 and center vertical lever 6 rotate in the counterclockwise direction in the diagram due to springs 7b and 6a respectively. Accordingly, mirror 10 is lowered.

Additionally, cam 4 rotates until stopping lever 12 drops into groove 4a. When stopping lever 12 drops into groove 4a, switch 14 is turned ON, and sequence motor 1 stops. During this time, a shutter charge lever 15 rotates in the clockwise direction around center C until such time as shutter charge lever 15 contacts lever 16 in order to allow shutter charging.

Film feed operations are described as follows:

In the context of film feeding or advancement, after the completion of shutter exposure, film motor 21 rotates, and such rotation is transmitted to the planetary gear attachment gear 23 via the reduction gear train 22, and during winding, a winding spool 26 is rotated via a winding idle gear 25. When a film F is wound onto winding spool 26, sprocket 27, which fits into the perforations of the film F, rotates. Such rotation is transmitted to a slit disk 28, which detects the amount of movement of the film F, and when one frame is wound, the film motor 21 is stopped by a photointerrupter 29.

On the other hand, during rewinding, the film motor 21 rotates in the direction opposite that realized during winding operations. The rotation of planetary gear 24 is transmitted to gear train 30, which rotation is then transmitted to a rewind fork gear 32 and a rewind fork 33 via a rewind gear shaft 31, and rewinding is performed.

The aforementioned discussions were directed to the sequences of operations carried out by the preferred embodiment including film feeding operations, mirror raising operations and aperture control operations.

Referring now to FIG. 2, therein illustrated is a sequence diagram that illustrates the operations of the embodiment illustrated in FIG. 1 during picture taking operations.

More particularly, in process ①, mirror raising and aperture control are performed, and in process ②, film F is exposed via operation of the shutter. Then, in process ③, mirror 10 is lowered and the camera's aperture is returned.

The aforementioned operations are such that when continuous shooting is performed in a camera which is equipped with a motor drive device, after the mirror is lowered in process ③, as shown in the diagram, photometry and range finding are performed at the point when mirror movement has settled, and the mirror raising of the next sequence is performed.

In the aforementioned way, in a camera mode in which continuous shooting is performed, photometry and range finding for a following picture taking operation are performed proximate to the shutter release operation and after the completion of the mirror lowering operation of an earlier photographic operation and when range finding and photometry become possible.

With a camera incorporating the preferred embodiment, when the respective mechanisms are driven via a battery, rotation of a sequence motor 1 is fast, and mirror raising time is short while the battery is fresh and close to being fully charged.

Because rotation is also fast when the mirror is lowered, the shock when the mirror 10 is lowered is great, and the return operation is long though the lowering time is short. Additionally, range finding and photometry start times become longer. However, during the period when a battery is fresh and at a stable voltage and rating, the mirror raising time and mirror lowering time, and, to a certain extent, the mirror return time is at a certain level, and range finding and photometry start times are at a minimum.

On the other hand, with a drained battery, in a way opposite to that mentioned above, the mirror raising time becomes long, and the mirror lowering time becomes long, but the mirror return time is at a minimum.

As shown in the FIG. 3, when mirror raising time is plotted on the horizontal axis, and the time at which the start of range finding and photometry is possible is plotted on the vertical axis, the result is the V-shaped curve depicted in FIG. 3. The result, however, can be expressed as a U-shaped curve (not shown).

With conventional devices, the longest range finding and photometry start time are set. Accordingly, the mirror raising time was measured, and control was performed with a time resulting from a fixed time being added to the mirror raising time as the time at which it was possible to start range finding and photometry after mirror lowering. For this reason, there were errors in the accuracy of range finding and photometry since extra time was consumed, and the frame feed speed did not increase. Accordingly, mirror raising and return times were not taken into account.

The preferred embodiment of the present invention takes the aforementioned problems into account, and is configured in such a way that it controls the range finding and photometry time for photographing a next photographic frame during the time from one shutter release operation to the next shutter release operation in a continuous shooting mode by adding a value which corresponds to the difference between the minimum mirror raising time at which range finding and photometry are possible and the measured mirror raising time.

More specifically, as shown in FIG. 3, if the minimum mirror raising time when a fresh battery is used and the mirror raising time when the battery has been drained and picture taking is not possible are controlled on the line which satisfies the shortest possible time at which the start of range finding and photometry are possible, control is good and frame feeding speed is fast.

Even more specifically, FIG. 3 shows an example of the case of the simplest control method, where the control line diagram is V-shaped.

The variables identified in FIG. 3 are defined as follows:
Mirror bound completion time: T
Mirror raising time: t mup
Minimum mirror bound completion time: T(min)
Minimum mirror raising time: t(min)
Mirror bound completion time with fresh battery: T high
Mirror raising time with fresh battery: t high
Mirror bound completion time with drained battery: T low
Mirror raising time with drained battery: t low In the diagram of FIG. 3, the estimated mirror bound completion time T1 with a fresh battery is as follows:

$$T1 = T\text{min} + (T\text{ high} - T(\text{min}))/(t(\text{min}) - t \text{ high}) \times (t(\text{min}) - t \text{ mup1})$$

The estimated mirror bound completion time T2 with a drained battery is as follows:

$$T2 = T\text{min} + (T\text{ low} - T\text{ min})/(t\text{ low} - t(\text{min})) \times (t \text{ mup2} - t(\text{min}))$$

Another possible method of obtaining this type of estimated mirror bound completion time involves expressing it as a U-shaped curve, for example, with higher coefficients of a second order or more.

With the preferred embodiment of the present invention, by performing continuous shooting regardless of the power source status, the optimum mirror raising time and photometry and range finding start times are carefully estimated and it is no longer necessary to drop the film feed speed during continuous shooting operations. Additionally, accurate photometry and range finding now are made possible.

Also, with the preferred embodiment of the present invention, it is not necessary to attach a special mirror lowering switch, thereby providing the advantage that there are no problems in terms of cost and camera space.

The present invention is not limited to the structure of the aforementioned embodiment. It is possible to appropriately change and modify the shapes and structures of the respective components of a motor driven camera which is equipped with an automatic exposure control device. For example, the present invention is not, of course, limited to internal camera mechanisms such as the mirror raising mechanism and aperture mechanism of the type shown in FIG. 1.

Although a preferred embodiment of the present invention has been shown and described, it will be readily appreciated by those skilled in the art that many changes and modifications may be made to such a preferred embodiment without departing from the principles and spirit of the present invention, the scope of which is defined in the appended claims and their equivalents.

What is claimed is:

1. An automatic exposure control device for use with a camera having a continuous shooting mode, the automatic exposure control device comprising:

a photometric unit to measure subject brightness;

an exposure control unit to control the automatic exposure control device according to the operation of the photometric unit;

a range finding unit to detect subject distance;

a focus control unit to focus a lens of the camera according to the operation of the range finding unit;

a mirror raising unit to raise a mirror of the camera; and a timer to time a measured mirror raising time for completion of a mirror raising operation by the mirror raising unit; wherein the automatic exposure control device controls the range finding and photometry start times during continuous shooting by waiting an amount of time after the shutter release operation corresponding to the difference between a minimum mirror raising time at which range finding and photometry are possible and the measured mirror raising time.

2. The automatic exposure control device according to claim 1, further comprising:

a motor to feed film frames;

a detection unit to detect the number of film frames fed by the motor; and a motor controller to control the motor according to the detection results of the detection unit.

3. The automatic exposure control device according to claim 1, further comprising:

a power source, and a film advance unit to advance film flames in accordance with photographic operations, the film advance unit being operated in accordance with battery output as related to the amount of time calculated by the timer.

4. The automatic exposure control device according to claim 3, wherein the power source is a battery that has a predetermined duty cycle.

5. The automatic exposure control device according to claim 3, wherein the power source is a battery that has a particular duty cycle.

6. A camera having an automatic exposure control device comprising:

a photometric unit to measure subject brightness;

an exposure control unit to control the automatic exposure control device according to the operation of the photometric unit;

a range finding unit to detect subject distance;

a focus control unit to focus a lens of the camera according to the operation of the range finding unit;

a mirror raising unit to raise a mirror of the camera; and a timer to time a measured mirror raising time for completion of a mirror raising operation by the mirror raising unit; wherein the automatic exposure control device controls the range finding and photometry start times during continuous shooting by waiting an amount of time after the shutter release operation corresponding to the difference between a minimum mirror raising time at which range finding and photometry are possible and the measured mirror raising time.

7. The camera according to claim 6, further comprising:

a motor to feed film frames;

a detection unit to detect the number of film frames fed by the motor; and a motor controller to control the motor according to the detection results of the detection unit.

8. The camera according to claim 6, further comprising:

a power source; and a film advance unit to advance unit advancing film frames in accordance with photographic operations, the film advance nit being operated in accordance with the output of a power source as related to the amount of time calculated by the timer.

9. The camera according to claim 8, wherein the power source is a battery that has a predetermined duty cycle.

10. The camera according to claim 8, wherein the power source is a battery that has a particular duty cycle.

11. A timing device for use in an automatic exposure control device having photometry and range finding operations for a camera, comprising:

a timing control device to control the start of the photometry and range finding operations by measuring a measured mirror rise time and starting the photometry and range finding operations after an estimated mirror bound completion time based on a difference between the measured mirror rise time and a predetermined mirror rising time corresponding to a minimum mirror bound completion time.

12. A method for controlling the start of photometry and range finding operations of an automatic exposure control device used with a camera, comprising the steps of:

measuring a measured mirror rise time;

calculating an estimated mirror bound completion time based on a difference between the measured mirror rise time and a predetermined mirror rising time corresponding to a minimum mirror bound completion time; and starting the photometry and range finding operations after the estimated mirror bound completion time.

* * * * *

UNITED STATES PATENT AND TRADEMARK OFFICE
CERTIFICATE OF CORRECTION

PATENT NO. : 5,640,625
DATED : June 17, 1997
INVENTOR(S) : Toshiaki HOZUMI

It is certified that error appears in the above-identified patent and that said Letters Patent is hereby corrected as shown below:

Column 8
Line 7, "nit" should be --unit--.

IN THE DRAWINGS

Fig. 1, "6b" should be --6a--, and "2a" should be --1a--.

Signed and Sealed this

Twenty-eighth Day of October, 1997

Attest:

BRUCE LEHMAN

*Attesting Officer*    Commissioner of Patents and Trademarks